(12) United States Patent
Martens et al.

(10) Patent No.: US 11,019,115 B2
(45) Date of Patent: May 25, 2021

(54) OBJECT LIFE CYCLE MANAGEMENT IN A PUBLISH-SUBSCRIBE ENVIRONMENT

(71) Applicant: INTERDIGITAL CE PATENT HOLDINGS, SAS, Paris (FR)

(72) Inventors: Kristof Martens, Herent (BE); Alex De Smedt, Olen (BE); Dominique Chanet, Aalst (BE)

(73) Assignee: Interdigital CE Patent Holdings, Paris (FR)

( * ) Notice: Subject to any disclaimer, the term of this patent is extended or adjusted under 35 U.S.C. 154(b) by 408 days.

(21) Appl. No.: 14/780,800

(22) PCT Filed: Mar. 18, 2014

(86) PCT No.: PCT/EP2014/055424
§ 371 (c)(1),
(2) Date: Sep. 28, 2015

(87) PCT Pub. No.: WO2014/154534
PCT Pub. Date: Oct. 2, 2014

(65) Prior Publication Data
US 2016/0088034 A1    Mar. 24, 2016

(30) Foreign Application Priority Data
Mar. 28, 2013 (EP) ..................... 13305390

(51) Int. Cl.
*G06F 3/00*     (2006.01)
*H04L 29/06*    (2006.01)
*G06F 9/54*     (2006.01)
*G06F 3/0482*   (2013.01)
(Continued)

(52) U.S. Cl.
CPC .......... *H04L 65/403* (2013.01); *G06F 3/0482* (2013.01); *G06F 3/04842* (2013.01); *G06F 9/542* (2013.01); *H04L 67/10* (2013.01)

(58) Field of Classification Search
CPC ..... H04L 65/403; H04L 67/10; G06F 3/0482; G06F 3/04842; G06F 9/542
See application file for complete search history.

(56) References Cited

U.S. PATENT DOCUMENTS 7,970,823 B2 *  6/2011  Moeller .................. G06F 9/542
                                              709/203
8,473,593 B1 *  6/2013  Graham ............... H04L 41/0266
                                              709/223
(Continued)

FOREIGN PATENT DOCUMENTS

EP    1008056    1/2007
GB    2417160    2/2006
(Continued)

OTHER PUBLICATIONS

B. Wang et al.: "Dimension transform based efficient event filtering for symmetric publish-subscribe system"; Publication Date : 2005; vol. 3588; pp. 1-10.
(Continued)

*Primary Examiner* — Anil N Kumar
(74) *Attorney, Agent, or Firm* — Invention Mine LLC

(57) ABSTRACT

A solution for objects in a publish-subscribe environment is described. An object determining unit determines an object identifier for the object, whereas a recipient determining unit determines a recipient identifier for the recipient which shall manipulate the object. An object request comprising at least the object identifier and the recipient identifier is then output to the publish-subscribe environment. Recipients of the object request check whether manipulation of an object is required and manipulate the object as required.

18 Claims, 5 Drawing Sheets

(51) Int. Cl.
   *G06F 3/0484* (2013.01)
   *H04L 29/08* (2006.01)

(56) References Cited

U.S. PATENT DOCUMENTS

| | | | | |
|---|---|---|---|---|
| 8,904,295 B2* | 12/2014 | Whalin | ............... | G06Q 10/10 715/753 |
| 9,395,883 B1* | 7/2016 | Olsson | ............... | G06F 3/0482 |
| 2006/0047742 A1* | 3/2006 | O'Neill | ............... | H04L 49/25 709/203 |
| 2006/0075141 A1* | 4/2006 | Boxenhorn | ........... | G06F 9/5038 709/246 |
| 2010/0313179 A1† | 12/2010 | Groves et al. | | |
| 2012/0215856 A1* | 8/2012 | Beardsmore | ............ | H04L 51/26 709/206 |
| 2012/0324373 A1* | 12/2012 | Halliday | ................ | G06Q 10/10 715/759 |

FOREIGN PATENT DOCUMENTS

| | | |
|---|---|---|
| GB | 2469936 | 11/2010 |
| WO | 2004072800 A2 | 8/2004 |
| WO | 2009109510 A1 | 9/2009 |
| WO | WO2012156851 | 11/2012 |

OTHER PUBLICATIONS

Search Report dated Aug. 5, 2014.
Summons to attend oral proceedings pursuant to Rule 115(1) EPC in corresponding European Patent Application 14710592.8, issued Jan. 23, 2020.

\* cited by examiner
† cited by third party

OBJECT LIFE CYCLE MANAGEMENT IN A PUBLISH-SUBSCRIBE ENVIRONMENT

This application claims the benefit, under 35 U.S.C. § 365 of International Application PCT/EP2014/055424, filed Mar. 18, 2014, which was published in accordance with PCT Article 21(2) on Oct. 2, 2014 in English and which claims the benefit of European patent application No. 13305390.0, filed Mar. 28, 2013.

FIELD OF THE INVENTION

The invention relates to a solution for object life cycle management. More specifically, the invention relates to a solution for object life cycle management in a publish-subscribe environment.

BACKGROUND OF THE INVENTION

In the software architecture domain, publish-subscribe (P/S) is a messaging pattern where senders of messages, called publishers, do not program the messages to be sent directly to specific receivers, called subscribers. Instead, published data is multicasted, without knowledge of what, if any, subscribers there may be. Similarly, subscribers subscribe to particular data, and only receive messages that are of interest, without knowledge of what, if any, publishers there are.

An exemplary P/S framework is shown in FIG. 1. Depicted are, beside the P/S entities, the relation between P/S Topics, and object instances as used by the applications. Note that DDS terminology (DDS: Data Distribution Service) is used in the FIG. 1.

There is a publish action from publishers to subscribers, in case an object, i.e. a topic instance, that they are linked to, experiences a change, e.g. due to an application handling it in some way, or due to a changed environment.

In a P/S environment as described above there is a problem of handling objects, in particular the object life cycle.

The following object life cycle methods are considered:
Create an object;
Update an object;
Delete an object;
Move an object to another context, i.e. delete the object in one context, create the same object in another context;
Simultaneously perform combinations of the above methods, if possible, e.g. move and update an object in combination.

Indeed, the P/S environment is data-oriented, whereas the above actions are rather method-oriented. Furthermore, the methods cannot act on an object as long as it is not created. Another problem is that there should be entities (roles) issuing the method, and entities (roles) performing the method.

SUMMARY OF THE INVENTION

It is an object of the present invention to propose an improved solution for manipulating an object in a publish-subscribe environment.

According to one aspect of the invention, a method for requesting manipulation of an object comprises the steps of:
determining an object identifier for the object;
determining a recipient identifier for the recipient which shall manipulate the object; and
outputting an object request comprising at least the object identifier and the recipient identifier to a publish-subscribe environment.

Accordingly, an apparatus configured to request manipulation of an object comprises:
an object determining unit configured to determine an object identifier for the object;
a recipient determining unit configured to determine a recipient identifier for the recipient which shall manipulate the object; and
an output configured to output an object request comprising at least the object identifier and the recipient identifier to a publish-subscribe environment.

Similarly, a computer readable storage medium has stored therein instructions enabling requesting manipulation of an object, which when executed by a computer, cause the computer to:
determine an object identifier for the object;
determine a recipient identifier for the recipient which shall manipulate the object; and
output an object request comprising at least the object identifier and the recipient identifier to a publish-subscribe environment.

Preferably, the object request further comprises a name of the object and characteristics of the object.

According to a further aspect of the invention, a method for manipulating an object comprises the steps of:
receiving an object request comprising at least an object identifier and a recipient identifier from a publish-subscribe environment;
responsive to receiving the object request, checking whether manipulation of an object is required; and
manipulating the object as required.

Accordingly, an apparatus configured to manipulate an object comprises:
an input configured to receive an object request comprising at least an object identifier and a recipient identifier from a publish-subscribe environment;
an evaluation unit configured to check whether manipulation of an object is required responsive to receiving the object request; and
a manipulating unit configured to manipulate the object as required.

Similarly, a computer readable storage medium has stored therein instructions enabling manipulation of an object, which when executed by a computer, cause the computer to:
receive an object request comprising at least an object identifier and a recipient identifier from a publish-subscribe environment;
responsive to receiving the object request, check whether manipulation of an object is required; and
manipulate the object as required.

The present invention describes a framework for the object life cycle in the P/S environment. It defines the related roles in that framework, and defines a one-request mechanism for performing all object life cycle methods. More specifically, two roles are described, namely the role of an Object Manager issuing the methods and the role of an Object Provider performing the methods. The CREATE, UPDATE, DELETE, and MOVE methods are incorporated into a single OBJECT_REQUEST method.

The framework allows an Object Manager to control or manage objects that it does not manage in its own controlled environment, but in an environment controlled by an Object Provider.

The proposed solution allows using methods for object life cycle management in a data oriented control system in an environment requiring dynamic object creation and handling. With only one method the complete object life cycle can be covered, the solution is hence rather simple. At the same time the proposed solution describes a framework. As such it can be re-used for many different applications requiring dynamic object handling. It is just a question of mapping the generic object life cycle roles to particular functions provided by the specific applications.

For a better understanding the invention shall now be explained in more detail in the following description with reference to the figures. It is understood that the invention is not limited to this exemplary embodiment and that specified features can also expediently be combined and/or modified without departing from the scope of the present invention as defined in the appended claims.

DETAILED DESCRIPTION OF PREFERRED EMBODIMENTS

Figure 1:
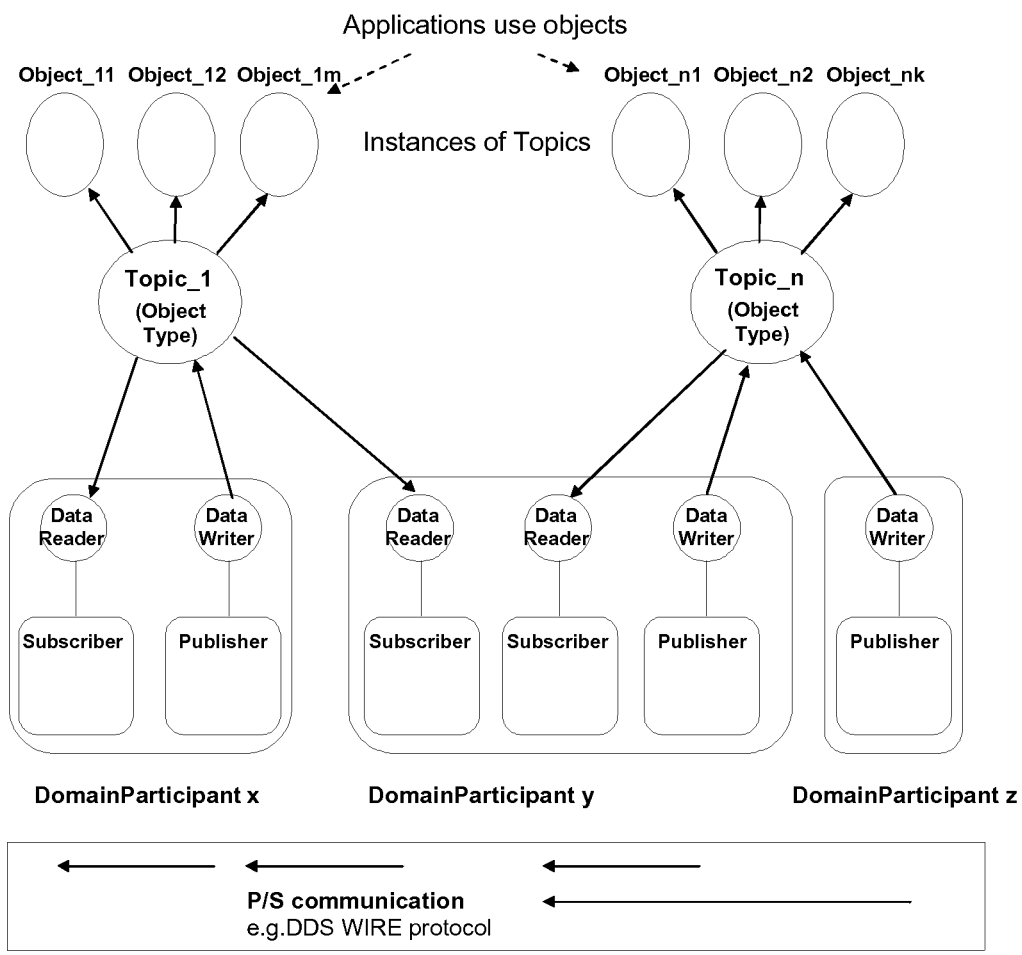
FIG. 1 schematically illustrates an exemplary P/S framework.
Figure 2:
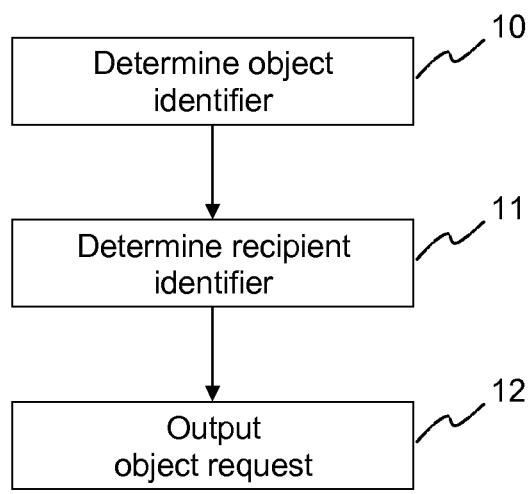
FIG. 2 depicts a method according to the invention for requesting manipulation of an object.

FIG. 2 depicts a method according to the invention for requesting manipulation of an object. In a first step an object identifier for the object is determined 10. Also determined 11 is a recipient identifier for the recipient which shall manipulate the object. At least the determined object identifier and the recipient identifier are then included in an object request, which is output 12 to a publish-subscribe environment. Depending on the intended manipulation, the object request further comprises a name of the object and characteristics of the object.

Figure 3:
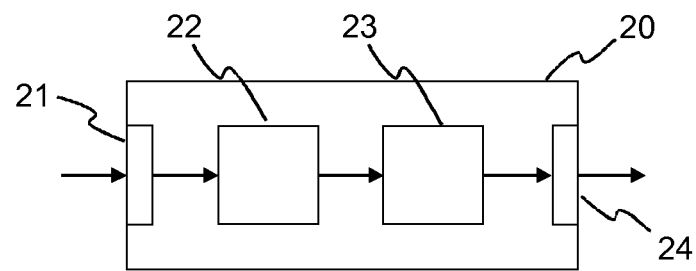
FIG. 3 schematically illustrates an apparatus configured to perform the method of FIG. 2.

An apparatus 20 configured to perform the method of FIG. 2 is schematically illustrated in FIG. 3. The apparatus 20 comprises an input 21 for receiving a request to initiate a request for manipulation of an object. The input 21 is, for example, a user interface or an application. An object determining unit 22 determines 10 an object identifier for the object, whereas a recipient determining unit 23 determines 11 a recipient identifier for the recipient which shall manipulate the object. The determined object identifier and the recipient identifier are then included in an object request, along with further data, if required, which is output 12 to a publish-subscribe environment via an output 24. Of course, the different elements of the apparatus 20 may likewise be combined into a single unit or implemented as software running on a processor.

Figure 4:
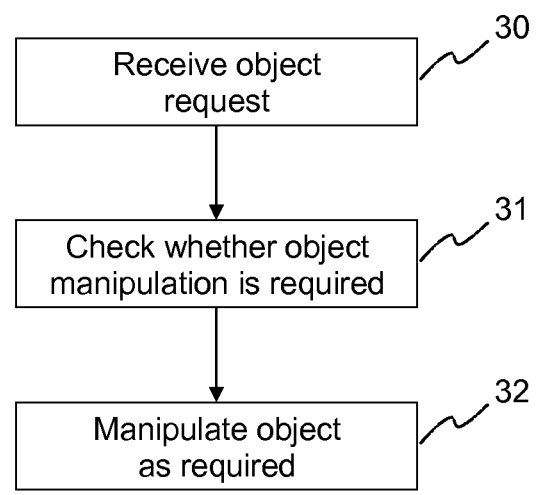
FIG. 4 depicts a method according to the invention for manipulating an object.

FIG. 4. depicts a method according to the invention for manipulating an object. An object request comprising at least an object identifier and a recipient identifier is received 30 a from a publish-subscribe environment. Responsive to receiving 30 the object request, the recipient of the object request checks 31 whether manipulation of an object is required. If this is the case, the object is manipulated 32 as required.

Figure 5:
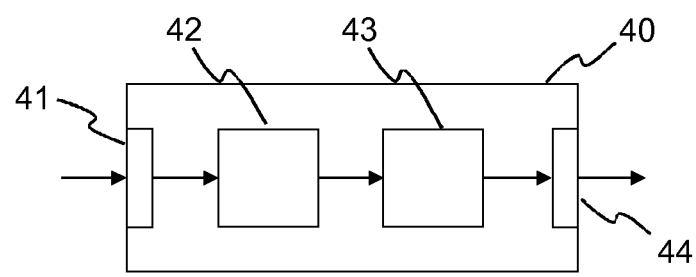
FIG. 5 schematically illustrates an apparatus configured to perform the method of FIG. 4.

An apparatus 40 configured to perform the method of FIG. 4 is schematically illustrated in FIG. 5. The apparatus 40 comprises an input 41 configured to receive 30 an object request comprising at least an object identifier and a recipient identifier from a publish-subscribe environment. An evaluation unit 42 checks 31 whether manipulation of an object is required responsive to receiving 30 the object request. If this is the case, a manipulating unit 43 manipulates 32 the object as required. If appropriate, the manipulated object is output to the publish-subscribe environment via an output 44. Of course, the different elements of the apparatus 40 may likewise be combined into a single unit or implemented as software running on a processor.

Figure 6:
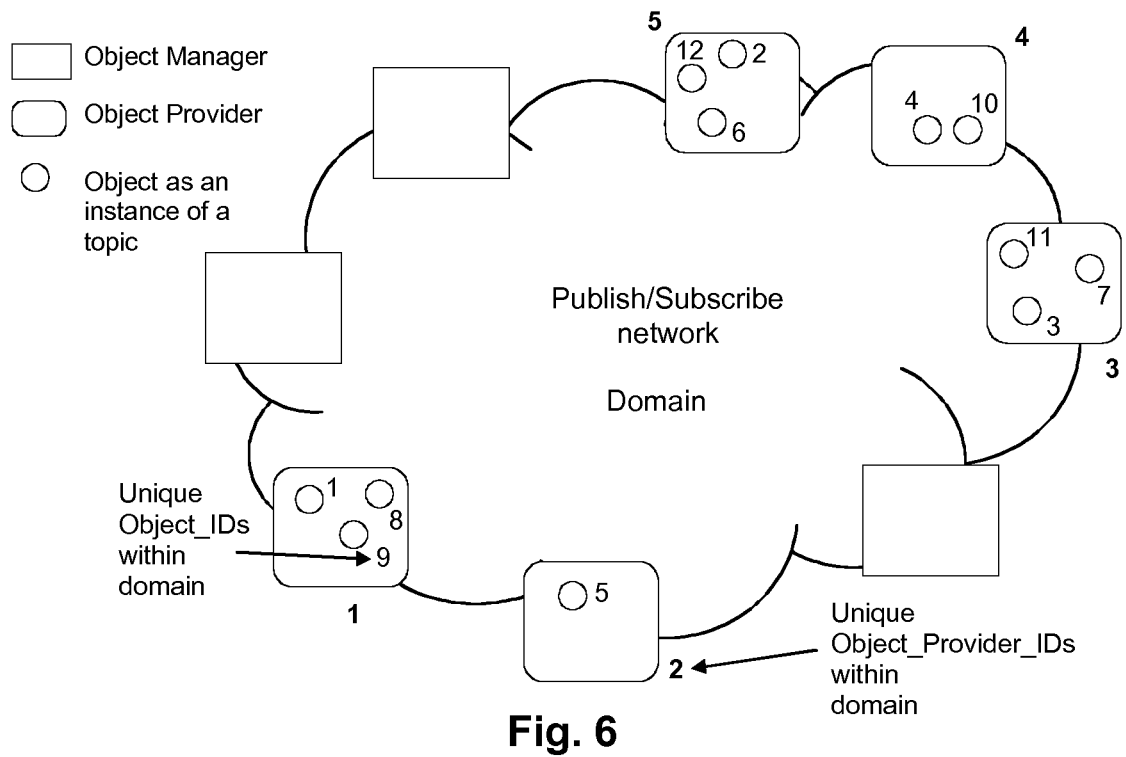
FIG. 6 shows a P/S framework according to the invention with Object Managers and Object Providers.

The P/S object life cycle framework according to the invention describes how dynamically created, modified, deleted, and moved objects are handled in a P/S environment. As illustrated in FIG. 6, the framework foresees two roles. An Object Manager fulfills the role of sending a life cycle request to an Object Provider. An Object Provider reacts to a request and performs the action, i.e. the creation, modification, deletion, or movement, requested for a particular object. The Object Provider is a container of objects and handles the life cycle of the objects on request of an object manager. Multiple Object Managers may issue requests to multiple Object Providers. Also Multiple Object Providers may receive requests from multiple Object Managers.

Usually an Object Manager is an application controlled by a user, via a user interface, which acts on data located on a device or data in an application on a device. An Object Provider is a control unit within an application or device, or the device itself, grouping and controlling a set of objects. An Object Provider acts upon a request of an Object Manager. It is not required that different Object Providers have knowledge of each other's existence. They are independent of each other.

In order to give some examples of what objects may be, in a note handling application ('sticky notes') the objects are the different notes that are available at any a particular time. In a document handling application, the objects are the representations of the different documents. In a multimedia application, the objects are the media endpoints controlled by the application.

Figure 7:
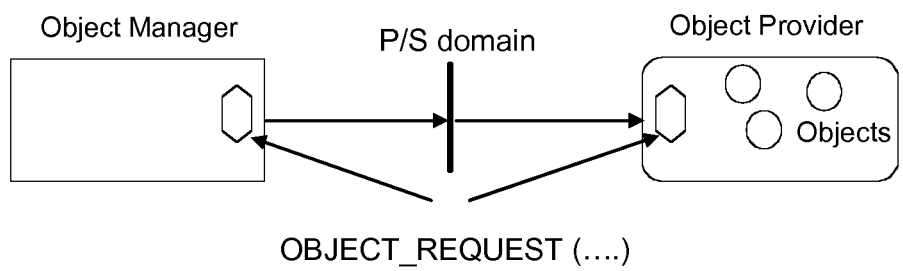
FIG. 7 illustrates the transfer of an OBJECT_REQUEST from an Object Manager to an Object Provider.

In the following the single object life cycle request representing all object life cycle methods shall be explained with reference to FIG. 7. An exemplary format of this request is as follows:

OBJECT_REQUEST (Object_ID, Object_Provider_ID, Name, parameters(value))

The object is identified by the 'topic' name and the Object_ID. The characteristics of a particular object are described by the parameters related to the object, which have a value. Within a P/S domain, the Object_ID numbers and the Object Provider_ID numbers are unique.

For example, if the object is a note, each note may have a name which is a number or a title, the characteristics may indicate dimensions, font, maximum of characters . . . .

Note that in a P/S environment, the OBJECT_REQUEST is considered as an Object/Topic itself, of which the parameter values are published when the Object Manager changes the values. All Object Providers subscribed to OBJECT_REQUESTs will receive the request. Only the Object Provider that is addressed will take action on the request.

Use of the object life cycle request for the different life cycle actions is as follows:

CREATE
OBJECT_REQUEST (Object_ID=j, Object_Provider_ID=p, Name=n, parameters=value)
The Object_ID_j is a non-existing one (in any of the object providers). Object Provider p creates the object in its area as a reaction to the request. The values in the OBJECT_REQUEST are assigned to the parameters of the object.

DELETE
OBJECT_REQUEST (Object_ID=j, Object_Provider_ID=void)
Object Provider p knows it has the Object j in its area. Object Provider p deletes Object j as a reaction to the request.

UPDATE
OBJECT_REQUEST (Object_ID=j, Object_Provider_ID=p, Name=n, parameters=other value)
Object Provider p knows it has the Object j in its area. Object Provider p updates the parameters of Object j as a reaction on the request with the new values as indicated.

MOVE
OBJECT_REQUEST (Object_ID=j, Object_Provider_ID=q, Name=n, parameters=value)
Object Provider p knows it has the Object j in its area. Object Provider p deletes Object j from its area, since the request says that Object j now belongs to Object Provider q. Object Provider q creates Object j in its area with the values of the parameters as indicated.

Figure 8:
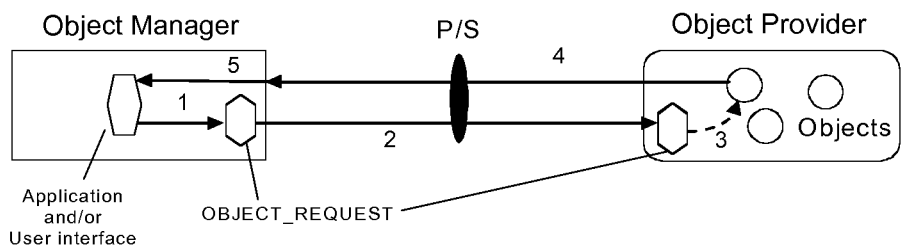
FIG. 8 gives an overview about an object handling mechanism according to the invention.

FIG. 8 gives an overview of the object handling mechanism according to the present invention.

Via a user interface and/or an application in the object manager, an object request action (create, update, . . . ) is entered 1. The OBJECT_REQUEST object data in the OBJECT_REQUEST object in the Object manager are changed accordingly. The OBJECT_REQUEST object is then published 2 over the P/S domain. The OBJECT_REQUEST object is read by all object providers who are subscribed to the OBJECT_REQUEST topic. The targeted Object Provider sees the request and creates, updates, deletes 3 the addressed object as requested. Note that a move implies a creation in one Object Provider and a deletion in another one. This object publishes 4 its status and characteristics (Created, Updated, Deleted). Note that there are two notifications over the P/S domain for a move, i.e. Deleted and Created. Finally, the result of the request is shown 5 on the Object Manager User interface or application.

In the following the invention shall be further explained using the example of a sticky note application. Sticky notes are attached to virtual walls. The sticky note application can show and manipulate (create, update, delete, move) notes from any wall that is present in its environment. In addition, the sticky note application itself can provide a virtual wall of its own.

As already indicated before, two roles are identified in the interaction of the sticky note application. The wall provider acts as a virtual wall and will own the notes attached to its wall, i.e. be responsible for publishing. The note user interface shows the notes to the user and presents him with the controls to manipulate notes. The sticky note application can play both roles simultaneously. It is conceivable that some headless device, e.g. a gateway, might implement an application that only acts as wall provider.

The data model of the sticky note application encompasses three main parts, namely the representation of the virtual walls to which notes can be attached, the representation of the notes themselves, and the representation of note manipulation requests. These note manipulation requests include creating a note, changing the text of a note, moving a note to a different wall, and deleting a note.

Every possible combination of values for the fields of the NoteRequest (corresponding to the above described OBJECT_REQUEST) has a meaning. Every request is either irrelevant for a given wall provider, or it is interpretable as a create, delete or update request.

From the point of view of the note user interface, the interpretation is equally simple. In order to create a new note, a new unique note ID (corresponding to the OBJECT_ID) is made up, a wall with its correct wall ID (corresponding to the OBJECT_PROVIDER_ID) is chosen, and the request is published. For updating an existing note, the request is published with the corresponding note ID, the current wall ID, and the new message. In order to move a note, the request is published with the note ID, the wall ID of the wall we want to move to, and the existing message. Effectively, this is a create action for the new wall and a delete action for the old wall combined in one request. For deleting a note, the request is published with the note ID and a void wall ID. The message (corresponding to the 'characteristics') is irrelevant in this case.

Figure 9:
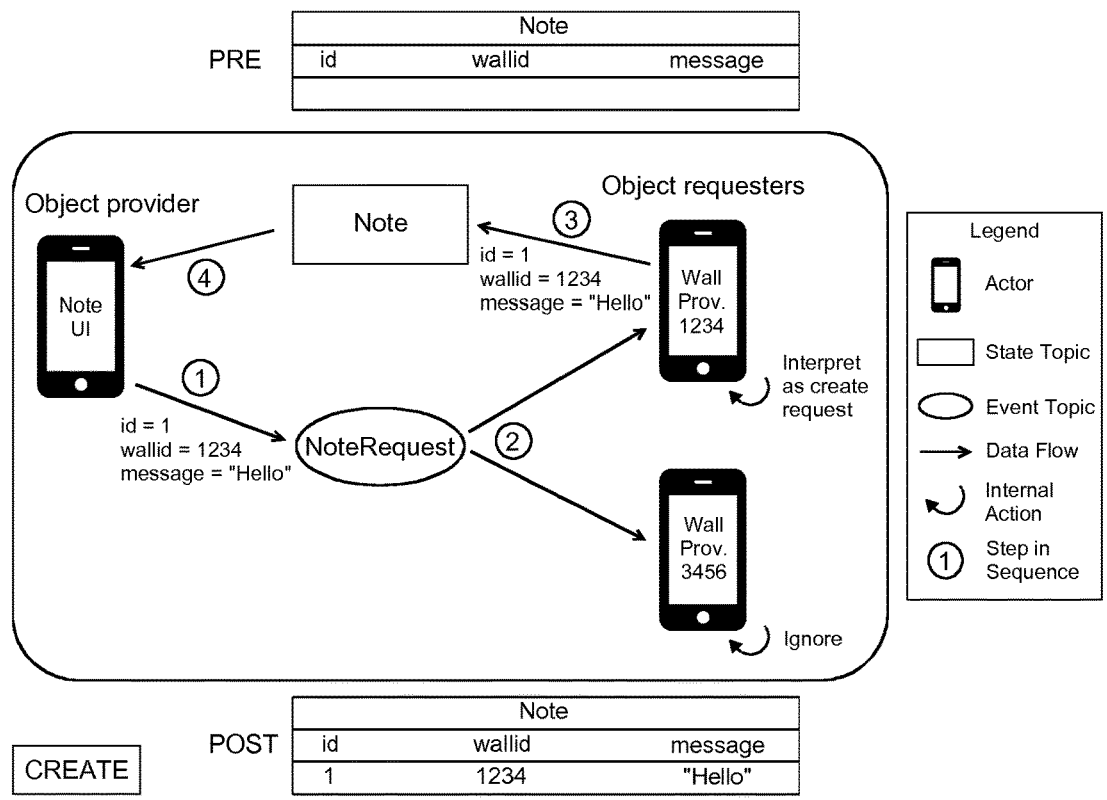
FIG. 9 shows a CREATE action realized using the proposed object life cycle management.

FIG. 9 illustrates a CREATE action:
1. The user creates a new note with the message "Hello", to be attached to the wall with ID 1234. The note user interface chooses a unique ID for the note (in this case, 1), and publishes the NoteRequest.
2. Upon reception of the NoteRequest event, the wall provider 1234 interprets it as a request for creation of a note. Wall provider 3456 ignores the request, as it is not relevant for its wall.
3. Wall provider 1234 then publishes a new note instance to the note topic.
4. The note user interface is notified of changes on the topic, discovers the new note, and updates its user interface.

Figure 10:
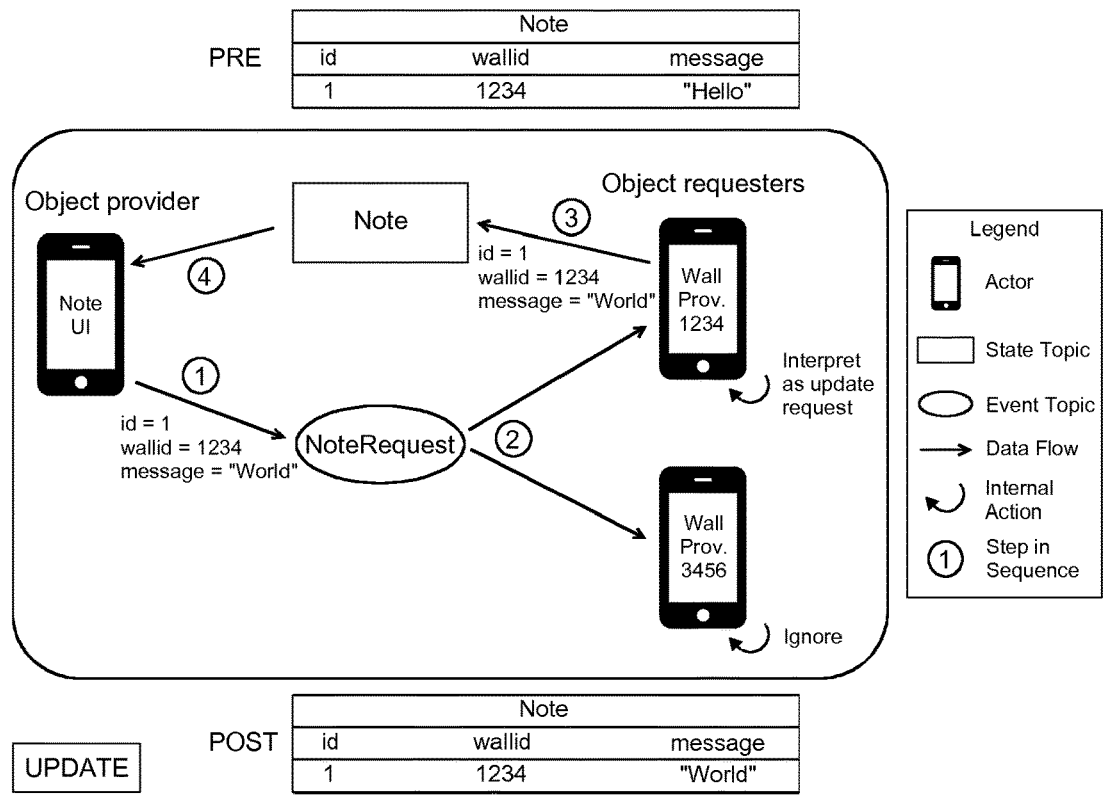
FIG. 10 shows an UPDATE action realized using the proposed object life cycle management.

FIG. 10 illustrates an UPDATE action:
1. The user decides to change the note's message from "Hello" to "World". The note user interface publishes the appropriate NoteRequest.
2. Upon reception of the NoteRequest event, wall provider 1234 interprets it as an update request for an existing note. Wall provider 3456 ignores the request as it is not relevant for its wall.
3. Wall provider 1234 publishes the updated note instance to the note topic
4. The note user interface is notified of changes on the topic, discovers the updated note, and updates its user interface.

Figure 11:
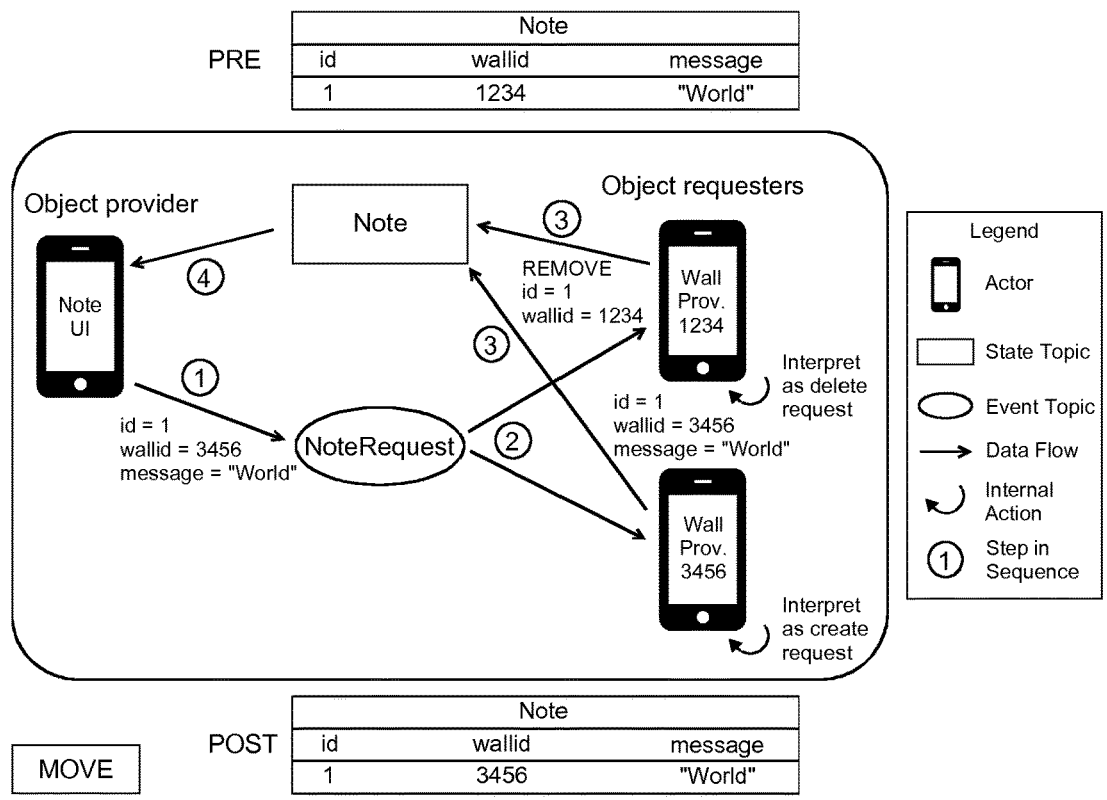
FIG. 11 shows a MOVE action realized using the proposed object life cycle management.

FIG. 11 illustrates a MOVE action:
1. The user moves the note to wall 3456. The note user interface publishes the appropriate NoteRequest.
2. Upon reception of the NoteRequest event, wall provider 1234 interprets it as a delete request for an existing note. Wall provider 3456 interprets the same event as a create request for a new note.

3. Wall provider 1234 removes its note instance from the topic, wall provider 3456 publishes a new note instance to the topic.

4. The note user interface is notified of changes on the topic, discovers the updated note, and updates its user interface.

Figure 12:
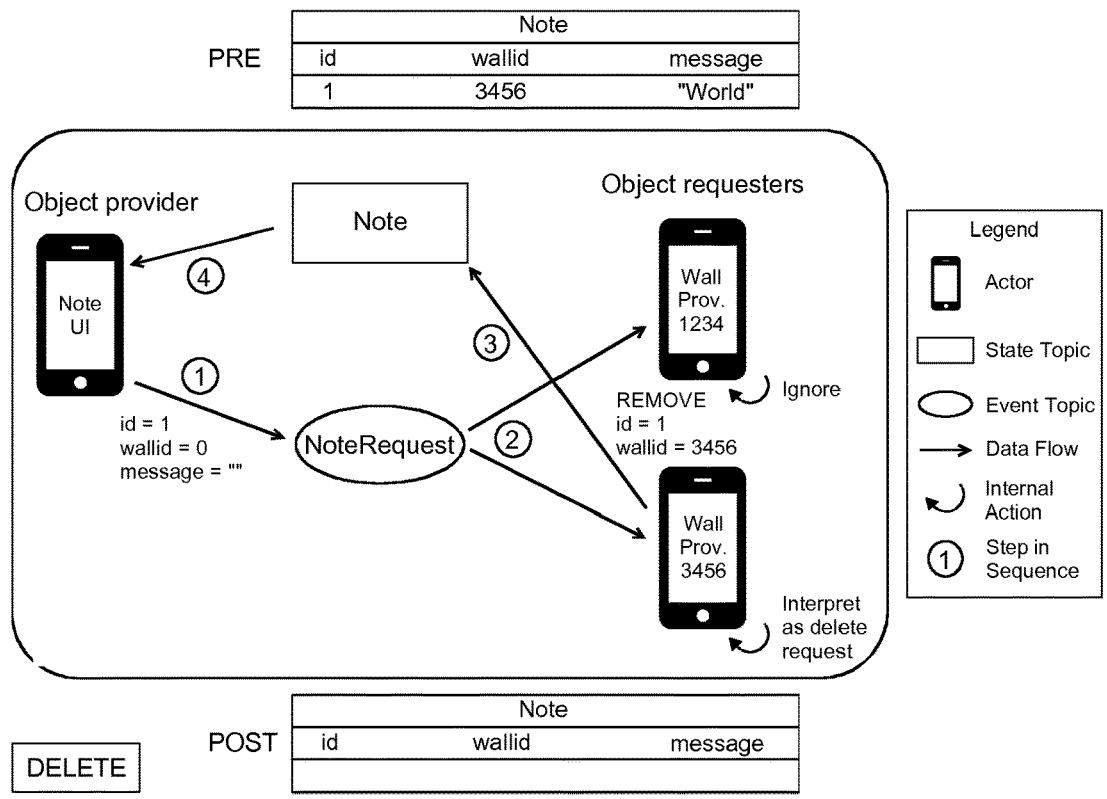
FIG. 12 shows a DELETE action realized using the proposed object life cycle management.

Finally, FIG. 12 illustrates a DELETE action:

1. The user deletes the note. The note user interface publishes the appropriate NoteRequest: it chooses a void wall ID (0).

2. Upon reception of the NoteRequest event, wall Provider 1234 ignores the request as it is not relevant to its wall. Wall provider 3456 interprets the request as a delete request.

3. Wall provider 3456 removes its note from the topic.

4. The note user interface is notified of changes on the topic, discovers that the note instance has been removed from the topic, and updates its user interface.

The invention claimed is:

1. A method comprising:
   determining, by an object manager, an object identifier for an object in a publish-subscribe environment, wherein the object is a topic instance of a topic to which multiple recipients may subscribe;
   determining, by the object manager, an object provider identifier associated with an object provider, wherein the object provider is identified to perform at least one action of a plurality of actions associated with a life cycle of the object, wherein the plurality of actions comprises creation of the object, modification of the object, deletion of the object, and movement of the object;
   generating, by the object manager, an object request configured to request performing, by the object provider, the at least one action of the plurality of actions associated with the life cycle of the object, wherein the object request comprises the object identifier and the object provider identifier, and wherein the object provider performing the at least one action is identified based on at least one of the object identifier and the object provider identifier of the object request; and
   outputting the object request to object providers subscribed to the topic to request the object provider to perform the at least one action on the object.

2. The method according to claim 1, wherein for movement of the object, upon receiving the object request, an object provider having the object identified by the object identifier deletes the object from the object provider's area and the object provider identified by the object provider identifier creates the object in the object provider's area.

3. The method according to claim 1, wherein the object request further comprises a name of the object and characteristics of the object.

4. An apparatus comprising:
   a processor of an object manager and a memory having stored software instructions operative, when executed by the processor, to cause the apparatus to:
      determine an object identifier for an object in a publish-subscribe environment, wherein the object is a topic instance of a topic to which multiple recipients may subscribe;
      determine an object provider identifier associated with an object provider, wherein the object provider is identified to perform at least one action of a plurality of actions associated with a life cycle of the object, wherein the plurality of actions comprises creation of the object, modification of the object, deletion of the object, and movement of the object;
      generate an object request configured to request performing, by the object provider, the at least one action of a plurality of actions associated with the life cycle of the object, wherein the object request comprises the object identifier and the object provider identifier, and wherein the object provider performing the at least one action is identified based on at least one of the object identifier and the object provider identifier of the object request; and
      output the object request to object providers subscribed to the topic to request the object provider to perform the at least one action on the object.

5. The apparatus according to claim 4, wherein for movement of the object, upon receiving the object request, an object provider having the object identified by the object identifier deletes the object from the object provider's area and the object provider identified by the object provider identifier creates the object in the object provider's area.

6. The apparatus according to claim 4, wherein the object request further comprises a name of the object and characteristics of the object.

7. A non-transitory computer readable storage medium having stored therein instructions that manage a life cycle of an object in a publish-subscribe environment, which instructions, when executed by a computer, cause the computer to:
   determine an object identifier for the object, wherein the object is a topic instance of a topic to which multiple recipients may subscribe;
   determine an object provider identifier associated with an object provider, wherein the object provider is identified to perform at least one action of a plurality of actions associated with a life cycle of the object, wherein the plurality of actions comprises creation of the object, modification of the object, deletion of the object, and movement of the object;
   generate an object request configured to request performing, by the object provider, the at least one action of a plurality of actions associated with the life cycle of the object, wherein the object request comprises the object identifier and the object provider identifier, and wherein the object provider performing the at least one action is identified based on at least one of the object identifier and the object provider identifier of the object request; and
   output the object request to object providers subscribed to the topic to request the object provider to perform the at least one action on the object.

8. The non-transitory computer readable storage medium according to claim 7, wherein for movement of the object, upon receiving the object request, an object provider having the object identified by the object identifier deletes the object from the object provider's area and the object provider identified by the object provider identifier creates the object in the object provider's area.

9. The non-transitory computer readable storage medium according to claim 7, wherein the object request further comprises a name of the object and characteristics of the object.

10. A method comprising:
   receiving, by an object provider, an object request configured to request performing, by the object provider, at least one action of a plurality of actions associated with the life cycle of an object in a publish-subscribe environment including a plurality of object providers, wherein the object is a topic instance of a topic to which multiple recipients may subscribe, wherein the object request comprises an object identifier and an object provider identifier from the publish-subscribe environment, wherein the object provider identifier identifies one of the plurality of object providers to perform the at least one action, and wherein the plurality of actions comprises creation of the object, modification of the object, deletion of the object, and movement of the object;

responsive to receiving the object request, checking, by the object provider, whether performing of the at least one action is required by the object provider based on at least one of the object identifier and the object provider identifier; and performing, by the object provider, the at least one action on the object as required.

11. The method according to claim 10, wherein for movement of the object, upon receiving the object request, an object provider having the object identified by the object identifier deletes the object from the object provider's area and the object provider identified by the object provider identifier creates the object in the object provider's area.

12. An apparatus comprising:
a processor of an object provider and a memory having stored software instructions operative, when executed by the processor, to cause the apparatus to:
receive an object request configured to request performing, by the object provider, at least one action of a plurality of actions associated with the life cycle of an object in a publish-subscribe environment including a plurality of object providers, wherein the object is a topic instance of a topic to which multiple recipients may subscribe, wherein the object request comprises an object identifier and an object provider identifier from the publish-subscribe environment, wherein the object provider identifier identifies one of the plurality of object providers to perform the at least one action, and wherein the plurality of actions comprises creation of the object, modification of the object, deletion of the object, and movement of the object;
check whether performing of the at least one action is required by the object provider based on at least one of the object identifier and the object provider identifier responsive to receiving the object request; and
perform the at least one action on the object as required.

13. The apparatus according to claim 12, wherein for movement of the object, upon receiving the object request, an object provider having the object identified by the object identifier deletes the object from the object provider's area and the object provider identified by the object provider identifier creates the object in the object provider's area.

14. A non-transitory computer readable storage medium having stored therein instructions that perform at least an action associated with a life cycle of an object in a publish-subscribe environment, which instructions, when executed by a computer, cause the computer to:
receive an object request configured to request performing at least one action of a plurality of actions associated with the life cycle of an object in the publish-subscribe environment including a plurality of object providers, wherein the object is a topic instance of a topic to which multiple recipients may subscribe, wherein the object request comprises an object identifier and an object provider identifier from the publish-subscribe environment, wherein the object provider identifier identifies one of the plurality of object providers to perform the at least one action, and wherein the plurality of actions comprises creation of the object, modification of the object, deletion of the object, and movement of the object;
responsive to receiving the object request, check whether performing of the at least one action is required by the object provider based on at least one of the object identifier and the object provider identifier; and
perform the at least one action on the object as required.

15. The non-transitory computer readable storage medium according to claim 14, wherein for movement of the object, upon receiving the object request, an object provider having the object identified by the object identifier deletes the object from the object provider's area and the object provider identified by the object provider identifier creates the object in the object provider's area.

16. The method according to claim 1, further comprising:
sending a life cycle request, by at least one object manager, to at least one object provider; and
responding, by the at least one object provider, to the life cycle request to perform the action of the plurality of actions.

17. The method according to claim 1, wherein the object is attached on a virtual wall in the publish-subscribe environment by an application that is integrated in the method.

18. The method according to claim 17, wherein the virtual wall is provided by the application.

* * * * *